United States Patent [19]

Von Blücher et al.

[11] Patent Number: 5,380,594
[45] Date of Patent: Jan. 10, 1995

[54] MICROSPHERULES OF ACTIVATED CARBON AND A PROCESS FOR MANUFACTURING THE SAME

[76] Inventors: Hubert Von Blücher, Freytagstr. 45, 4000 Düsseldorf, Germany; Hasso Von Blücher, Columbusstr. 58, 4000 Düsseldorf, Germany; Ernest De Ruiter, Höhenstrasse 57a, 5090 Leverkusen, Germany

[21] Appl. No.: 648,683

[22] Filed: Jan. 31, 1991

Related U.S. Application Data

[63] Continuation-in-part of Ser. No. 527,418, May 23, 1990, abandoned, which is a continuation of Ser. No. 855,195, Apr. 23, 1986, abandoned, which is a continuation-in-part of Ser. No. 788,279, Oct. 17, 1985, abandoned.

[30] Foreign Application Priority Data

Mar. 21, 1985 [DE] Germany .............................. 3510209
Feb. 14, 1986 [EP] European Pat. Off. ............ 86101960

[51] Int. Cl.$^6$ ................................................ B32B 5/16
[52] U.S. Cl. ..................................... 428/403; 428/402; 428/408
[58] Field of Search ............... 428/402, 403, 407, 408, 428/404, 313.9

[56] References Cited

U.S. PATENT DOCUMENTS

| | | | |
|---|---|---|---|
| 4,111,713 | 9/1978 | Beck ..................................... | 428/402 |
| 4,510,193 | 4/1985 | Blucher et al. .................... | 428/196 |

*Primary Examiner*—Patrick J. Ryan
*Assistant Examiner*—N. Edwards
*Attorney, Agent, or Firm*—Sprung, Horn, Kramer & Woods

[57] ABSTRACT

Porous spherical shaped small bodies of activated carbon having a diameter of from 0.1–1 mm and an inner surface of from 600–2000 mg$^2$/m made from milled and already activated carbon particles of a size below 60 μm linked together by bridges from 10–100%, of their weight of water insoluble synthetic resins added as aqueous dispersions, and, as a result of the irregular, often splinterlike shape of the carbon particles, having gaps between these particles spread throughout the whole mass of the porous body, the size of the gaps being of the same order of magnitude as the particles themselves.

8 Claims, No Drawings

MICROSPHERULES OF ACTIVATED CARBON AND A PROCESS FOR MANUFACTURING THE SAME

This application is a continuation-in-part of application Ser. No. 527,418, filed May 23, 1990, now pending, which is a continuation of application Ser. No. 855, 195, filed April 23, 1986, now abandoned, which is a continuation-in-part of application Ser. No. 788, 279, filed Oct. 17, 1985, now abandoned.

The use of activated carbon for purifying liquids or gases is generally known in the art. A detailed description is rendered in the book of H. yon Kienle and E. Bäder "Aktivkohle und ihre industrielle Anwendung" Ferdinand Enke Verlag, Stuttgart 1980.

The use of pulverulent activated carbon is not possible for many purposes so that one has to switch over to die-pressed or molded carbon (Formkohle). The use in the form of blanks, for example, for pharmaceutical purposes, is of secondary importance.

Molded carbon is characterized by high activity and good hardness. Its regular, often rod-shaped configuration is particularly advantageous for use in charging filters.

Molded or shaped carbon is, for example, manufactured from ground pit coal and a pitch binder. The mixture is pressed to strands by means of an extruder, if desired, cut down, and the so-obtained sausage-shaped articles or cylinders are then smouldered, i.e. carbonized, and activated. Limits are set by the process technology as to the minimum dimension, which is in the range of approximately one millimeter.

Other methods are applied for producing spherical particles, in particular small beads or globules. For example, a dispersion is prepared from bitumen under pressure, above its softening point, in a medium which is not miscible therewith, such as water, said dispersion being quenched, the so-obtained beads of bitumen extracted with a suitable solvent, oxidized, carbonized and finally activated.

The activated carbon globules thus produced have a hard shell and a somewhat softer core and, for instance, diameters of from 0.1 to 1 mm, with a relatively large size distribution. The abrasion resistance is very high by virtue of the particularly hard core. The inner surface amounts to approximately 600 to 1500 $m^2/g$, with a relatively high component of micropores $(10-15 \times 10^{-10}$ m$)$.

An alternative method for preparing carbonized carbon globules form bitumen consists in spraying molten bitumen to obtain the desired droplet size and feeding these droplets together with an inert gas through a zone heated to between 800° C. and 1600° C.

Another possibility of producing activated carbon beads comprises heating organic cation exchangers in a fluidized bed rapidly to 600°-700° C. and thereafter activating the same, for example, with water vapor. The strength of the resulting absorber spherules is satisfactory for most applications. Although it is a little lower than that of the material prepared from bitumen.

The object of the invention is to produce in a simpler manner solid spherical, or approximately spherical, particles exhibiting a high activated carbon component and a controllable size between 0.1 and 1 mm and at the same time a narrow size distribution.

This is effected according to the invention by kneading finely milled activated carbon particles of a size below 160 $\mu$m together with the dispersion of a water-insoluble synthetic resin to form an intimate mixture; pressing the latter through a screen plate having holes adapted to the size of the desired small globules; powdering, peletizing and drying the so-obtained microspherules. When thermosetting synthetic resins are used, hardening may follow thereupon.

Another possibility for manufacturing the microspherules (not microballoons) from activated carbon in accordance with the invention wherein finely milled activated-carbon particles of less than 160 $\mu$m in size are bonded with a synthetic resin that is insoluble in water consists in accordance with the invention of placing active-carbon particles of less than 100 $\mu$m in size in a pelletizer equipped with a vortexer and little by little adding an aqueous dispersion of the water-insoluble synthetic resin during the operation until globules of the desired size form are formed, turning off the vortexer but allowing the pelletizer to continue operating, immediately powdering the microspherules off, and drying, and sorting.

The two aforesaid methods yield spherules or globules with diameters of more than 0.1 mm, concentrated in a range of 0.3 to 0.6 mm. Spherules smaller than 0.1 mm can be desirable for special applications, in which case spray drying is appropriate, even though larger spherules can also be produced thereby. A liquor consisting essentially of finely milled activated carbon, binder dispersion, and water is in this method sprayed into a spray tower through nozzles, and the droplets dried with an opposing current of hot air.

The invention departs from activated carbon powder having particles smaller than 160 $\mu$m, preferably smaller than 50 $\mu$m. Pulverulent carbon of that kind is prepared by very fine grinding and has a particle size of from 0.1-50 $\mu$m, preferably from 1-10 $\mu$m.

In a typical commercial product, 98% are smaller than 62 $\mu$m and 65% smaller than 22 $\mu$m for example. Such activated carbons may exhibit predetermined pore sizes and at the same time a very high inner surface of up to 2000 m/g.

Pulverulent activated carbon has a mostly fine sharp-edged structure, as can be seen under the microscope. For this reason, inspite of the lubricating effect of the water-insoluble synthetic resin of the utilized dispersion, relatively great amounts of water are necessary to knead the pulverulent carbon with the dispersion to an intimate mixture which can then be pressed through screens, perforated plates or the like. This is done, for example, by means of double screw-type extruders, having screws that are surrounded at their end portions with screen-like sheathings. Another possibility is to arrange a screen plate at the end of conventional extruders.

In both cases, the diameter of the outlet openings for the intimate mixture of powdered carbon and synthetic resin dispersion should be from 0.1 to 1 mm, preferably from 0.3 to 0.7 mm. The discharged mass has then the shape of fine strands which, when their consistency is correctly adjusted, break into pieces several diameters long.

If one tries to convert the so-obtained "sausages" or small cylinders into the spherical form by means of the usual pelletizing devices, one does not succeed in obtaining spherules having approximately the diameter of the extruders particles, but substantially larger pellets of very different diameters are formed by agglomeration, which can be of the order of some millimeters to one centimeter or even more. After drying and screening to the desired grain size, spherules of the kind may be serviceable for specific fields of application, however, the object of producing small spherules cannot thus be realized.

The attempt of reducing the amount of water originating from the synthetic resin dispersion to obtain a drier extrudate which does not coalesce to larger agglomerates when it is pelletized is rapidly limited because then it will not be possible to extrude the mixture. It is very difficult to harmonize the consistency necessary for shaping the extrudate into spherules, the necessary binder component is the finished product, and the pliability of the mass required for extrusion, including the water content.

Surprisingly enough, it was found that one succeeds in obtaining from the very fine strands of the intimate mixture of the milled activated carbon powder with the synthetic resin dispersion spherules having approximately the same diameter as the strands if the extruded strands are powdered with a fine powder between their exit from the screen plate and their feed on the granulating or pelletizing device.

Graphite or the same active carbon powder that is used according to the invention are preferably utilized. One can also use powders of substances which are desired for modifying the activated carbon, such as constituents selected from the group consisting of flame-proofing agents, in particular antimony trioxide, metal powder (e.g. Al, Ni) or other adsorbent materials, in particular silicic acid xerogels, metal oxides and hydroxides, in particular aluminum oxide and hydroxide, and molecular sieves.

The powdering may be continued on the granulating plate or the pelletizing device. The amount of powder used for the powdering operation is advantageously selected in such a manner that a subsequent screening from finely divided particles is not necessary. A few weight percent, based on the extruded strands, is usually enough. At all events, this method allows, with the help of the conventional devices for the protection of fine spherules of the kind, e.g. those used in the pharmaceutical industry, in particular the so-called marumerizer, to obtain spherules having a diameter of from 0.1 to 1 mm, in particular from 0.3 to 0.7 mm. They can be subsequently dried and allowed to harden, e.g. in a fluidized bed or a rotary drier.

The aforesaid problems in processing the particles extruded from the intimate mixture of activated-charcoal powder and synthetic-resin dispersion in known pelletizers or granulators are even more difficult when an attempt is made to directly convert the activated-carbon powder into microspherules by adding a dispersion of a water-insoluble synthetic resin. The intended sphere diameters cannot be attained even with devices, pelleting or granulating mixers for example, that can be used to obtain particle sizes of less than 1 mm from other powders, but at a considerable level of fineness only a granulate with diameters larger than 2 mm will form. Even when the mixer is provided with a rotating vortexing tool (otherwise known as a vortexer or beater), although the desired small spherules can be maintained while the device is on, as soon as it is turned off, as it must at least to be emptied, larger spheres and blackberry-like aggregates will form again out of the smaller spherules. The utilizable portion was only between 5 and 35%, depending on the type of carbon and binder. Although adding pelletizing adjuvants like bentonites or extremely fine types of cement for example did improve the overall picture, they had a deleretious effect on the moisture resistance and adsorptive properties of the activated-carbon granulate. Only powdering off immediately after turning off the vortexer while keeping the pelletizer on in the method in accordance with the invention was helpful. Powdering off is done in this case with the same powders employed in the aforesaid alternative method of manufacturing the microspherules in accordance with the invention from activated carbon. The subsequent steps of drying and sorting are also, as in the alternative method, practical once the pelletizing mixer has been emptied into appropriate devices known to those skilled in the art.

It is possible according to the method of the invention to produce microspherules of the specified diameter having a very narrow grain distribution spectrum which can be utilized for most purposes directly, once slight amounts of oversize and undersize particles have been removed, without further screening or sifting. Their synthetic resin component, calculated as dry substance, amounts to approximately 10–100, in particular 15–30, weight per cent, based on the amount of dry activated carbon.

Although small spherical bodies are produced from the carbon powder with the help of a water-insoluble synthetic resin, said globules usually exhibiting a diameter which is considerably greater than that of the activated carbon particles of the powder carbon, these small bodies are characterized by an inner surface which, compared to that of the utilized carbon powder, is hardly smaller and, depending on the selected activated carbon, amounts to from 600 to 2000 $m^2/g$.

The water-insoluble synthetic resins substantially contribute to this result which according to the method of the invention are added as aqueous dispersion to the carbon powder. The water-insoluble synthetic resin is preferably an elastomer, a thermoplastic or duroplastic. Dispersions of synthetic resins which are suitable for the purposes of the invention are, for example, polyurethane latices, such as Impranil DLN (Bayer) acrylate latices, such as the acronales (BASF), synthetic rubber latices, such as neoprene (Du Pont), and latices of copolymers, for example acrylates and styrene. In general latices with film forming temperatures 20° C. are preferred. Such latices form "bridges" between the carbon particles instead of covering the whole particle with a thin "skin" of polymer.

In order to prevent a phase separation during extrusion, i.e. the squeezing of the water, swelling agents or thickening agents may be added to the mixture (cf. Römpps Chemie Lexikon, 8. edition, page 4488).

The resin particles usually have sizes from 0.1–1 $\mu m$. They form links (bridges) between the carbon particles. As a result of the highly irregular and often splinterlike shape of the carbon particles there are gaps between the particles. These gaps nave the same dimension as the particles themselves and are spread over the whole spherelike bodies of the invention. The gaps communicate with each other, forming thus a "megapore system" which contributes largely to the transport of products in the body. The classical macro-, meso- and micropores are found as usual in the carbon particles and are very accessible through the "megapores".

Depending on the desired application, a variety of substances may be admixed with the small spherules of activated carbon of the invention. Depending on their chemical nature and compatibility, these substances may be added as powder to the pulverulent carbon prior to the mixing with the binder dispersion in the extruder, they may serve for powdering or they may be incorporated in the synthetic resin dispersion. Usual flameproofing agents consist, for example, of finely-divided antimony trioxide in combination with compounds of bromine, e.g. decabromodiphenyl ether. The latter may, for instance, be already present in the synthetic resin of the dispersions while the antimony trioxide, analogous to the activated carbon particles, may be kneaded together with the aqueous dispersion of the water-insoluble synthetic resin to form an intimate mixture, or may be utilized later on as powdering agent. The same applies to other known pulverulent modifiers or the adsorbent materials, already mentioned above.

The macropores and mesopores of the activated carbon may be loaded with additives such as heavy metal catalysts, fireproofing agents, anti-bacterial or anti-fungal substances.

The loading of the activated carbon with enzymes, in particular before adding the binder, results in pellets of high enzymatic activity. The large molecules of the enzymes may also penetrate up to the mesopores., in border-line cases also up to the largest micropores and are there enclosed by the binder macromolecules; they are, however, still accessible for smaller molecules. The increase of concentration of the reagents caused by the adsorption on the activated carbon results in a high reaction rate. Finally, activated carbon contains practically always in sufficient amount the water necessary for many enzymatic reactions. Also specific catalysts, such as proposed, for example, for eliminating odor (intestinal gases of colostomy patients), may be added during the manufacture of the claimed molded carbon. One obtains a carbon suitable for hematocatharsis by adding during the preparation an anticoagulating agent (e.g. acetylsalicylic acid) and compounds of zirconium (for fixing phosphates).

In some cases, the molded carbon is impregnated if, for example, the mere adsorption is not sufficient (gas mask filters) or specific catalytic effects are desired. However, a considerable portion of the salts is deposited near the surface which impairs both the adsorption itself as well as the action of the salts. It is possible according to the method of the invention to deposit metal salts already on the particles of the pulverulent activated carbon before the addition of the synthetic resin dispersion, so that they are very uniformly distributed in the produced spherules.

Another decisive advantage of the method of the subject invention is that the modification by heat sensitive chemical or biological substances may be conducted with the pulverulent activated carbon and, hence, before the encapsulation which is associated with the shaping of the spherules, all this being conducted at only moderately elevated temperatures at which these substances, e.g. enzymes, are not damaged.

The small spherical bodies of activated carbon according to the invention can be used for every purpose for which fine molded carbon of the kind, though prepared in a different manner, has been used heretofore, for example, for fixed bed filters. By virtue of their symmetry, the globules of the invention can withstand mechanical strain better than other shapes and they have the highest volume/surface ratio, proportional to the diameter. This is particularly important for producing flexible flat-shaped filters, e.g. in the form of protective suits against chemical war gas. The preferred diameters of the spherules of from 0.5 are the optimum compromise between adsorption kinetics (proportional to the surface) and capacity (proportional to the volume).

Porous spherical shaped bodies of activated carbon having a diameter of from 0.1–1 mm and an inner surface of from 600–2000 $mg^2/m$ made from milled and already activated carbon particles of a size below 60 $\mu m$ linked together by Dridges from 10–100%, preferably 15–30%, of their weight of water insoluble synthetic resins (elastomers, thermoplastics or duroplastics) added as aqueous dispersions, and. as a result of the irregular, often splinterlike shape of the carbon particles, having gads between these particles spread throughout the whole mass of the porous body, the size of the gaps being of the same order of magnitude as the particles themselves.

EXAMPLE 1

A homogeneous mixture was prepared in a kneading machine consisting of the following components:

| | |
|---|---|
| ground activated carbon water content 25% by weight | 6350 g |
| polyurethane dispersion weight of the dry substance 45% (Impranil DLN) | 4650 g |
| water | 2570 g |
| lubricants (polyethylene oxide solution) M 740/1 (plate) | 600 g |

This mass was extruded through a screen plate having holes of 0.5 mm diameter into strands. These strands were powdered with 2% activated carbon powder, based on the total weight, and shaped into spherules in a marumerizer. Said spherules were dried in a rotating drum with a hot air stream. The proportion of spherules having a diameter of from 280 to 630 $\mu m$ was 90%.

EXAMPLE 2

50 kg of extremely finely milled activated carbon with a mean inner surface of 1400 m/g and a size distribution of

| | |
|---|---|
| up to 3 $\mu m$: | 6% of total |
| up to 4 $\mu m$: | 14% of total |
| up to 8 $\mu m$: | 33% of total |
| up to 11 $\mu m$: | 42% of total |
| up to 16 $\mu m$: | 53% of total |
| up to 22 $\mu m$: | 65% of total |
| up to 31 $\mu m$: | 77% of total |
| up to 44 $\mu m$: | 89% of total |
| up to 62 $\mu m$: | 98% of total |
| up to 88 $\mu m$: | 100% of total | were placed in a commercially available pelletizing mixer with an effective capacity of 150 l and equipped with a clockwise-rotating, sloping mixture container, a rotating vortexing tool, and a material baffle.

The activated powdered carbon contained 25% water by weight. 35 kg of an acrylate dispersion containing dried substance was added over 5 minutes. The vortexer was turned off and another 1 kg of activated-carbon powder was added to the still rotating mixture container. The resulting spherules were dried in a drum drier. 39 kg of the dried microspherules with diameters of 0.1 to 0.6 mm, a yield of 75%, were sifted out. The inner surface of the product was still always 900 $m^2/g$. The fines can be reused in the next charge with fresh activated-carbon powder.

EXAMPLE 3

Activated-charcoal powder suspended in an aqueous dispersion of acrylate as in Example 2 was sprayed into a commercially available spray-drying device with an evaporating capacity of 200 kg of water per hour. The binder and carbon and their ratio were also the same as in Example 2, although more water was added to obtain a viscosity of approximately 1000 cP. The hot-air temperature was approximately 400° C., the mean droplet trajectory approximately 10 m, and contact time approximately 15 seconds. Up to 75% spheres ranging from 0.2 to 0.5 mm were obtained (in terms of dry substance). The temperature of the spherules remained below 110° C. The activity was absolutely comparable to that of the spheres from Examples 1 and 2.

It will be understood that the specification and examples are illustrative but not limitative of the present invention and that other embodiments within the spirit and scope of the invention will suggest themselves to those skilled in the art.

What is claimed is:

1. Porous spherical shaped small bodies of activated carbon having a diameter of from 0.1–1 mm and an inner surface of from 600–2000 mg/m made from milled and already activated carbon particles of a size below 60 μm linked together by bridges from 10–100%, of their weight of water insoluble synthetic resins added as aqueous dispersions, and, as a result of the irregular, often splinterlike shape of the carbon particles, having gaps between these particles spread throughout the whole mass of the porous body, the size of the gaps being of the same order of magnitude as the activated carbon particles themselves.

2. Porous spherical bodies of activated carbon according to claim 1, wherein said water insoluble synthetic resins are elastomers former plastics or duroplastics.

3. Porous spherical bodies of activated carbon according to claim 1, wherein the activated carbon particles are linked together by bridges from 15 to 30 of their weight of said insoluble synthetic resin.

4. Porous spherical bodies of activated carbon according to claim 1, having incorporated therein at least one of an enzyme, metal compound fireproofing agent or decontaminating agent.

5. Porous spherical bodies of activated carbon according to claim 1, coated with a thin porous metal layer.

6. Porous spherical bodies of activated carbon according to claim 1, having incorporated therein a heat sensitive enzyme.

7. In a protective flexible filter sheet carrying a carbon adsorbent, the improvement wherein the carbon is in the form of porous spherical shaped small bodies of activated carbon according to claim 1.

8. In an air purifying system including a carbon adsorbent, the improvement wherein the carbon is in the form of porous spherical shaped small bodies of activated carbon according to claim 1.

* * * * *